United States Patent Office 3,079,379
Patented Feb. 26, 1963

3,079,379
METHOD FOR THE PREPARATION OF
ADENOSINE 5'-TRIPHOSPHATE
Kuniyoshi Tanaka, Toyonaka, and Mikio Honjo,
Asahiku, Osaka, Japan, assignors to Takeda Pharmaceutical Industries, Ltd., Osaka, Japan
No Drawing. Filed Aug. 2, 1960, Ser. No. 46,882
Claims priority, application Japan Aug. 4, 1959
7 Claims. (Cl. 260—211.5)

This invention relates to a novel method for the preparation of adenosine 5'-triphosphate.

Adenosine 5'-triphosphate, known as "ATP" in short, is an energy-rich phosphate valuable in the transfer of phosphate bond energy, enabling the organism to deposit glucose as glycogen. Hence, not only does it play an important role as an energy source or a phosphoric acid-donor in a wide scope of reactions in biological phenomena, but also it has recently been utilized as a medicament for the treatment or prevention of such a disease as cardiopathy, myasthenia, rheumatic fever and geriatric diseases. In other words, ATP is an important reagent for biochemical researches, as well as a member of medicinal drugs utilizable for therapeutic uses.

In view of the importance of ATP in biochemical and medical fields, many attempts have so far been made to extract or synthesize ATP. As a result, it has been clarified that ATP can be recovered from animal nucleus through extraction, or can be prepared from adenosine 5'-monophosphate, known as AMP in short, through synthesis. Though there are many reports or publications on the preparation of ATP, the method reported by H. G. Khorana in the Journal of the American Chemical Society, vol. 80 (1958), p. 1141 is considered to be one of the most profitable methods. In the method of H. G. Khorana, AMP is condensed with orthophosphoric acid ($H_3PO_4$) in the presence of dicyclohexylcarbodiimide.

The present inventors have traced these known methods, especially the method of H. G. Khorana, and have investigated the reaction conditions of the method. It has now been clarified that the product of this method is always contaminated with a considerable amount of adenosine 5'-diphosphate and diadenosine pyrophosphate. This is an unavoidable shortcoming of this method which is due to the nature of the reaction.

Attempts have been made by the present inventors to establish a novel method for the preparation of ATP, which is more profitable than the Khorana's method and which has no such a shortcoming as above. And, it has now been discovered that ATP or its esters can be synthesized in a good yield through the reaction between adenosine 5'-phosphoramidate and pyrophosphoric acid or its esters, avoiding the formation of such by-products as mentioned above.

On the basis of the foregoing discovery, the present invention has been completed, and it relates to a method for the preparation of ATP, which is characterized by reacting adenosine 5'-phosphoramidate with pyrophosphoric acid or its ester, then, if necessary, rupturing the ester combinations.

It is an object of this invention to provide a novel method for the preparation of ATP, and the object is realized by the reaction between adenosine 5'-phosphoramidate and pyrophosphoric acid or its ester.

Adenosine 5'-phosphoramidate which is representable by the Formula I is synthesized after the manner described in the Journal of the American Chemical Society, vol. 80 (1958), p. 3755.

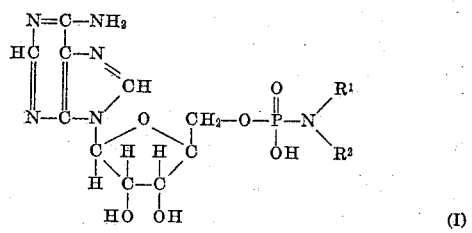
(I)

In the Formula I, $R^1$ and $R^2$ represent the same or different atoms or atomic groups, and they may be hydrogen, alkyl groups such as methyl, ethyl and propyl groups, alkenyl groups such as ethenyl and propenyl groups, aryl groups such as phenyl groups, and bivalent groups such as bivalent polyalkylene groups, for instance. Thus,

represents amide, monomethylamide, diethylamide, diphenylamide, morpholide, piperidide, piperazide, etc. The method for synthesizing adenosine 5'-phosphoramidate after the manner described in the aforementioned journal is effected by allowing AMP to react with ammonia to produce the Compound I wherein both $R^1$ and $R^2$ are hydrogens, or with an organic amine to produce the Compound I wherein both $R^1$ and $R^2$ are such organic groups as mentioned above, or one of them is an organic group and the other is hydrogen.

Adenosine 5'-phosphoramidate or its N-substituted derivatives as above are all usable as the starting material of this invention in the free state or in the state of their salts. The Compound I can form salts with inorganic or organic bases, and the salts may be usable as the starting material of this invention. Among them, organic base salts are rather preferable, because they are generally soluble in convenient organic solvents, whereas inorganic base salts are insoluble in them. Among the organic base salts, the salts of Compound I with dicyclohexylguanidine or its derivatives such as N-(3-oxapentamethylene)guanidine or N-(pentamethylene)guanidine are the most convenient, because the Compound I can be directly obtained in the form of such salts when the Compound I is synthesized by the method disclosed in the afore-cited Journal of the American Chemical Society, vol. 80 (1958), p. 3755 in which dicyclohexylcarbodiimide is employed.

Another starting material, pyrophosphoric acid or its ester, is representable by the Formula II,

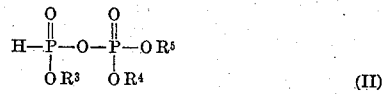
(II)

wherein each of $R^3$, $R^4$ and $R^5$ represents hydrogen or organic radical, preferably alkyl or aryl or aralkyl group. That is, the Compound II may be free pyrophosphoric acid or its mono-, di- or tri-ester. Or, the acid may be used as its alkali or alkaline earth metal salts or as its organic base salts. The salt may be sodium salt, potassium salt, trimethylammonium salt, piperidinium salt, etc. The ester may be benzyl ester, phenyl ester, for instance. It is preferred to employ the pyrophosphoric acid in the state of esters or of organic base salts, because they are generally soluble in various organic solvents and the product, an ester or organic base salt of adenosine 5'-triphosphate, can easily be converted into ATP.

The reaction in this invention proceeds through elimination of an amine from both reactants, adenosine 5'-phosphoramidate and pyrophosphoric acid, to form ATP or its ester. When the product is an ester of ATP, the reaction of rupturing the ester combination is conducted subsequently to convert the ester into ATP. The substituents of both reactants, $R^1$, $R^2$, $R^3$, $R^4$ and $R^5$, therefore, have no direct connection with the reaction of this invention. Hence, these substituents may be of any kind so long as they do not obstruct the desired deamination condensation.

The condensation between the two reactants eliminating an amine is generally brought about in a suitable organic solvent. The organic solvent may be pyridine, acetonitrile, cresol and ortho-chlorophenol, for instance. The reaction can be carried out at a considerably low temperature. The reaction, therefore, is not required to be conducted under heating, rather it is effected sometimes under cooling. The reaction may generally proceed smoothly at room temperature. The reaction proceeds smoothly under substantially anhydrous conditions, under which the contamination of the product with undesirable by-products such as diadenosine pyrophosphate is avoided.

The reaction proceeds while the reactants mixture is allowed to stand for an adequate period. Though it is not necessary to agitate the mixture in most cases, it is required to agitate the mixture vigorously when one or both of the reactants are hardly or not soluble in the solvent employed. The necessary time for the reaction is in general two to three days, but it may be preferable to leave the mixture standing until the desired condensation is completed. If one or more of the substituents $R^3$, $R^4$ and $R^5$ in the Compound II are not hydrogen, the resultant is the corresponding ester of ATP in its phosphoric acid part. Therefore, the ester combination should be ruptured to obtain free ATP. The rupture reaction can be carried out through a per se known method such as hydrolysis with an alkali or reductive hydrolysis. But, the hydrolysis sometimes is accompanied with the rupture of the bonding between adenosine and phosphoric acid. Therefore, the hydrolysis may preferably be avoided except when the ester is a special ester such as paranitrophenyl ester which can be hydrolyzed with a considerably weak alkaline solution. The reduction can be effected catalytically with palladium or platinum catalyst. The rupture reaction of the ester combination is not always required to be conducted on the purified ester, but it may be conducted on the crude ester contained in the reaction mixture.

ATP thus produced can be recovered from the reaction mixture as its alkali metal salt such as sodium salt. If necessary, ATP is once recovered as its salt hardly soluble in water such as mercury salt or barium salt, and then converted into its sodium salt through double decomposition. Or, ATP can be purified through adsorption on a suitable adsorbent such as activated charcoal and ion exchange resin, then eluted with a suitable solvent. As the ion exchange resin, there may be used basic anion exchange resin in halide type. The resin is available, for example, from Dow Chemical Co., U.S.A. under the name of Dowex-1 or from Rohm & Haas Co., U.S.A. under the name of Amberlite IRA–400. As the solvent for eluting ATP, there may be used aqueous alcohol containing ammonia or an acid saline solution. Another purification process consists in that an organic solvent which is miscible with water and does not dissolve ATP-salts is added to a considerably concentrated aqueous solution of an alkali metal salt of ATP to precipitate the corresponding ATP-salt. These purification processes may be applied solely or in combination or repeatedly.

The present invention thus provides a novel method for the preparation of ATP. And, the method of this invention is superior to that reported by H. G. Khorana which has been deemed as one of the most profitable methods for the purpose. That is, according to Khorana's report the reaction product contains 2% of AMP, 28% of adenosine 5'-diphosphate, etc., 60% of ATP and 10% of polyphosphates (the Journal of the American Chemical Society, vol. 80 (1958), p. 1144). On the other hand, the reaction product obtained by the method of this invention contains 22% of AMP, 5% of adenosine 5'-diphosphate and 73% of ATP (the analysis was carried out on the reaction product of Example 1 described later). From this result, it is easily understood that the yield of ATP in this method is higher than in known methods, and that by-products which are useless for the synthesis of ATP are hardly produced. Though, in the method of this invention, the unchanged AMP is recovered in a considerable amount, the recovered AMP can again be used as starting material of this method.

The following working examples are given for the purpose of illustrating the embodiments of this invention, although they have no meaning of restriction or limitation of the scope of this invention. And, it should be understood that any modification and any variation of the method substantially described in the foregoing description as well as in the appended claims are all within the scope of this invention.

In the examples, all percentages are in weight percent except when otherwise specified, all temperatures are uncorrected, and the relationship between part by weight and part by volume is the same as that between gram and milliliter.

*Example 1*

With a solution of 0.29 part by weight of well dried 1,3-dicyclohexylguanidinium adenosine 5'-phosphoramidate in 5 parts by volume of ortho-chlorophenol is admixed a solution of 0.95 part by weight of bis-triethylammonium pyrophosphate in a mixed solvent composed of 1 part by volume of ortho-chlorophenol and 2 parts by volume of acetonitrile. The mixture is left standing at 20° C. for 2 days. Then 30 parts by volume of water is added to the mixture. After washing with three 15 parts by volume-portions of diethyl ether, the aqueous layer is separated, and the remaining diethyl ether in the aqueous layer is removed under reduced pressure. Five parts by weight of activated charcoal is added to the aqueous layer, and the mixture is stirred for 30 minutes. The activated charcoal is filtered and further 1 part by weight of activated charcoal is added to the filtrate. After 20 minutes agitation, the activated charcoal is taken out by filtration. The combined activated charcoal is washed with a little water, and eluted twice with respective 300 and 200 parts by volume-portions of 50% (volume) ethanol containing 2% (volume) of concentrated aqueous ammonia. The eluate is concentrated to 40 parts by volume, then is passed through a column packed with 20 parts by volume of a strongly basic anion exchange resin in bead form (chloric type) (polystyrene trimethylbenzyl ammonium type resin sold under the name of Dowex-1 from Dow Chemical Company, Mich., U.S.A.). Then, the column is washed with 750 parts by volume of an acid aqueous saline solution containing 0.01 normal hydrochloric acid and 0.02 normal sodium chloride and then eluted with 600 parts by volume of an acid aqueous saline solution composed of 0.01 normal hydrochloric acid and 0.2 normal sodium chloride. After neutralizing with a diluted sodium hydroxide solution, the eluate is treated with activated charcoal to adsorb ATP as its sodium salt. The separated activated charcoal is washed with water and eluted with 50% (volume) ethanol containing 2% (volume) of concentrated aqueous ammonia. The eluate is concentrated to 0.5 part by volume, then 5 parts by volume of ethanol is added. The precipitate thus deposited is centrifuged and dried at low temperature to obtain 0.155 part by weight of tetrasodium salt of ATP containing 4 moles of water of crystallization as a colorless crystalline powder. The yield is 47% relative to the theoretical. The various analytical data of the product are as follows:

| | Observed | Theoretical value |
|---|---|---|
| Adenine content calculated from molar extinction coefficient at the wave length of 260 millimicrons (micromoles per milligram) | 1.48 | 1.50 |
| Molar Ratio, Adenine: Labile P: Organic P | 1:1.98:3.03 | 1:2:3 |
| Inorganic phosphate (micromoles per milligram) | 0.03 | 0 |
| Percent ATP measured by electrophoretic assay | 94.3 | 100.0 |
| Percent ATP measured by resin assay [1] | 92.8 | 100.0 |
| Percent ATP measured by enzymic assay [2] | 93.0 | 100.0 |

[1] Journal of the American Chemical Society, vol. 72 (1950), p. 4273.
[2] Journal of Biological Chemistry, vol. 220 (1956), p. 9.

*Example 2*

A solution of 0.55 part by weight of well dried dicyclohexylguanidinium adenosine 5′-phosphoramidate in 3 parts by volume of ortho-chlorophenol is admixed under cooling with a solution of 0.77 part by weight of tribenzyl pyrophosphate in 5 parts by volume of ortho-chlorophenol. After being kept standing in a refrigerator for 2 days, the reaction mixture is warmed at 60° C. for 15 minutes, and then 50 parts by volume of water is added to the reaction mixture. The mixture is washed five times with respective 50 parts by volume-portions of diethyl ether, and the aqueous layer is separated, and the remaining diethyl ether is removed under reduced pressure. The palladium-carbon prepared by shaking 3 parts by volume of 2% aqueous solution of palladium chloride with 0.6 part by weight of activated charcoal in a hydrogen stream is added to the aqueous solution and the mixture is shaken in a stream of hydrogen for 1.5 hours to rupture the ester combination. The catalyst is filtered up, and eluted with 50% (volume) aqueous ethanol containing 2% ammonia. Following this, the eluate is treated in the same manner as in Example 1, whereupon tetrasodium salt of ATP is obtained as a colorless crystalline powder.

*Example 3*

To a solution of 0.46 part by weight of N-(3-oxapentamethylene)guanidinium adenosine 5′-phosphoromorpholidate in 5 parts by volume of ortho-chlorophenol is added a solution of 0.90 part by weight of tribenzyl pyrophosphate in 10 parts by volume of the same solvent as above. After three days' standing at room temperature, the mixture is treated as Example 1 to obtain tetrasodium salt of ATP as a colorless crystalline powder.

*Example 4*

A solution of 0.30 part by weight of well dried cyclohexylammonium adenosine 5′-phosphoramidate in 5 parts by volume of tricresol (a commercial solvent composed of ortho-, meta- and paracresol) is admixed with a solution of 1.10 parts by weight of triethylammonium pyrophosphate in a mixed solvent composed of 2.8 parts by volume of tricresol and 1 part by volume of acetonitrile. A treatment similar to that in Example 1 gives tetrasodium salt of ATP as a colorless crystalline powder.

Having thus disclosed the invention, what is claimed is:

1. A method for the preparation of a member selected from the group consisting of adenosine 5′-triphosphate, and its ester, which comprises condensing a member selected from the group consisting of adenosine 5′-phosphoramidate, adenosine 5′-phosphoric substituted amides, and their salts with a member selected from the group consisting of pyrophosphoric acid, its ester and their salts.

2. A method for the preparation of adenosine 5′-triphosphate, which comprises condensing a salt of adenosine 5′-phosphoramidate with an ester of pyrophosphoric acid, and rupturing the ester combination in the molecule of the condensation product through catalytic reduction with hydrogen.

3. A method for the preparation of adenosine 5′-triphosphate, which comprises condensing dicyclohexylguanidinium salt of adenosine 5′-phosphoramidate with tribenzyl ester of pyrophosphoric acid, and rupturing the ester combination in the molecule of the condensation product through catalytic reduction with hydrogen.

4. A method for the preparation of adenosine 5′-triphosphate, which comprises condensing N-(3-oxapentamethylene)guanidium salt of adenosine 5′-phosphoromorpholidate with tribenzyl pyrophosphate, and rupturing the ester combination in the molecule of the condensation product through catalytic reduction with hydrogen.

5. A method for the preparation of adenosine 5′-triphosphate, which comprises condensing a salt of adenosine 5′-phosphoramidate with a salt of pyrophosphoric acid.

6. A method for the preparation of adenosine 5′-triphosphate, which comprises condensing dicyclohexylguanidinium salt of adenosine 5′-phosphoramidate with triethylammonium salt of pyrophosphoric acid.

7. A method for the preparation of adenosine 5′-triphosphate, which comprises condensing cyclohexylammonium salt of adenosine 5′-phosphoramidate with triethylammonium salt of pyrophosphoric acid.

References Cited in the file of this patent

Chambers et al.: Jr. Am. Chem. Soc., 80 (1958), pages 3749–52.